W. WESTLAKE.

Lantern.

No. 2,175. Reissued Feb. 13, 1866.

Witnesses:
Geo. C. Lambright
J. Smith

Inventor:
Mr. Westlake
by Atty Thos. J. Everett

N. PETERS, Photo-Lithographer, Washington, D. C.

UNITED STATES PATENT OFFICE.

WILLIAM WESTLAKE, OF CHICAGO, ILLINOIS.

IMPROVEMENT IN LANTERNS.

Specification forming part of Letters Patent No. 50,192, dated September 26, 1865; Reissue No. 2,175, dated February 13, 1866.

*To all whom it may concern:*

Be it known that I, WILLIAM WESTLAKE, of the city of Chicago, in the county of Cook and State of Illinois, have invented a certain new and useful Improvement in Lanterns; and I do hereby declare that the following is a full, clear, and exact description thereof, reference being had to the accompanying drawings, and to the letters and marks thereon.

In the construction of lanterns, many, and in some instances all, of the plates or pieces of metal out of which the lantern is made, are cut out and swaged or otherwise made into form and shape by dies and machinery. This gives to the several plates or pieces of metal great uniformity and contributes largely to the ease and rapidity and economy of making lanterns. Owing, however, to the fact that there is a want of uniformity in the globes of lanterns, some provision is necessary to accommodate the metal portion of the lantern to the glass or globe portion, and also the different parts of the metal portion to each other, so that every facility may exist for constructing a safe, durable, and convenient lantern.

My invention has for its object the meeting of the provisions here alluded to and relates to the construction of certain parts of the lantern and the adaptation of the metal parts to the safe and proper fitting in of the globe.

Figure 2:
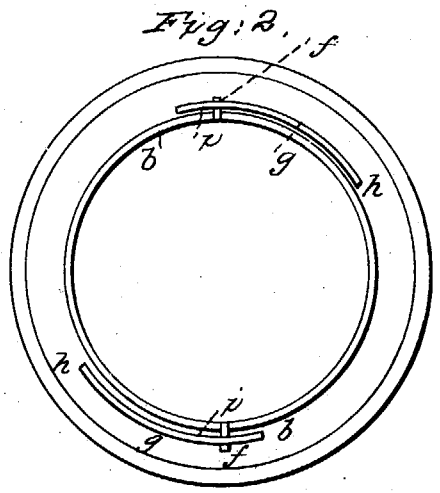
Figure 1:
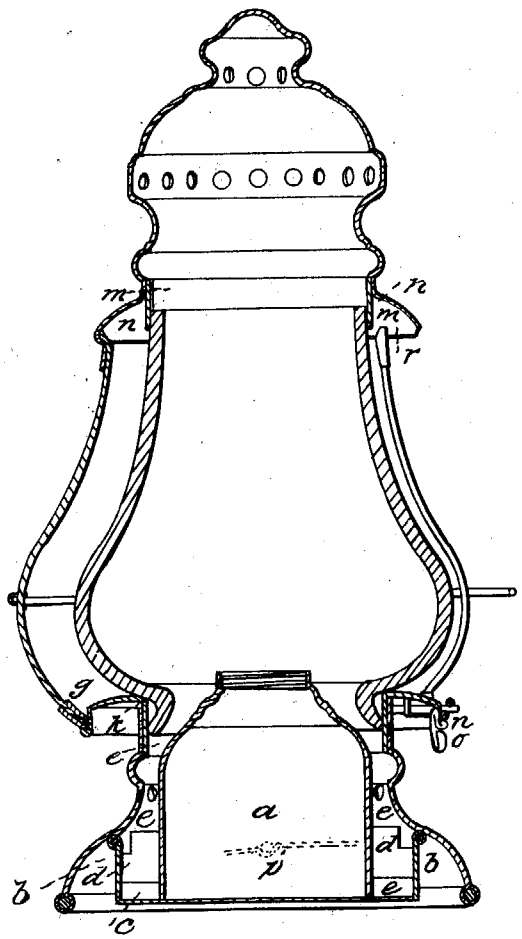

The drawings forming a part of this specification represent a lantern with my improvement, Figure 1 being a vertical sectional view of such lantern, and Fig. 2 being a view of the bottom, showing the means by which the oil-cup is connected to the lower part of the lantern. In each of these figures the same marks and letters are used to indicate the same parts when shown.

The oil-cup *a* is surrounded by a band, *b*, which is of the character of a flange at right angles, or nearly so, to the bottom of the cup, the bottom continuing outward so that an annular space, *c*, exists between the sides of the cup and the band. This space, *c*, is a receptacle for any oil that may escape from the cup or is spilled in filling or supplying it with oil, and will therefore tend to the keeping of the lower part of the lantern clean and free from oil or any matter adhering to it. A band, *d*, extending down from the interior of the bottom *e*, serves to guide the band of the cup in fitting in and taking out the cup to aid in keeping it in place. Pins *f* project outward from the band *b*, and spring rods or wires *g* are attached at one end, *h*, to the bottom *e*. Near the outer or playing ends of the springs *g* is a little deflection or recess, *i*, into which the pins *f* fit when the oil-cup is attached. By clasping the bottom of the cup with the thumb and fingers of one hand and using only a moderate degree of force, the cup can readily be attached to or detached from the bottom of the lantern.

It will be noticed that the globe *j* is kept in position by the interior portions or parts of the lantern and not cemented therein, as is common, its condition being that which has been denominated "the loose globe." The means by which it is held in place in the lantern of this improvement allow of its easy adjustment, ready attachment and detachment, and replacement in case of injury, or replacement in case of injury or breakage.

It will be seen that the globe rests upon the point *k* of the bottom plate and against the band *l*, which lines the interior of the bottom plate of the globe. It also performs an important part in the proper fitting in of the globe, as a thinner or thicker band may be used or employed by virtue of the greater or lesser diameter of the lower edge of the globe.

The top part of the globe rests within and is surrounded by the lower band, *m*, of the dome, this lower band extending down within the plate *n*. The object of this extension of the band *m* is to adapt the dome to the length or height of the globe, as globes vary in this respect. When this adaptation has been made, the band *m* can be soldered and secured to the plate *n*, a good and proper connection being thus secured.

The bottom part of the lantern is attached to the guard of the lantern by spring-catches, *o*, fitting over the lower bar, *p*, of the guard, and as the upper part of the guard is affixed to the plate *n*, when the parts are in position, the globe will be retained without the use of cement, either at the bottom or at the top, and by liberating the catches *o* from the bar *p*, from the guard, and the dome being in one part, and the bottom and oil-cup being in another part, the globe may easily be detached alone, leaving all the other parts of the lantern together.

The upright bars of the guard are connected to the lower bar, *p*, by tips *q*, which embrace the lower bar, *p*, and surround the ends of the upright bars to which they are soldered, thus making a stronger and more durable connection than can be made by wire, which has heretofore been the means used for securing the bars together. It will be plainly seen that tips can be used for securing the horizontal bar at the top of the vertical or upright bar of the guard, as is described for the lower end.

The top of the upright bars of the guard, as is shown by Fig. 1, at *r*, are turned outward or hooked, so that when soldered or otherwise properly secured to the plate *n*, they also make a firm and durable connection between the guard and the dome of the lantern.

The upper ends of the upright bars may have tips, as shown by the drawings, or not, as may be deemed best.

Having thus described my invention, what I claim as new, and desire to secure by Letters Patent, is—

1. The band *d*, in combination with the band *b*, for the purpose set forth.

2. The band *l*, in combination with the band or upright portion of the bottom *e*, for keeping the bottom of the globe in place, as herein described.

3. The means described, or its equivalent, for securing the ends of the upright bars to the horizontal bars of the guard.

WILLIAM WESTLAKE.

Winesses:
JAS. A. COWLES,
SETH M. DURNING.